(12) United States Patent
Boden

(10) Patent No.: US 9,525,621 B2
(45) Date of Patent: Dec. 20, 2016

(54) SEMAPHORE SOFT AND HARD HYBRID ARCHITECTURE

(71) Applicant: Marvell World Trade Ltd., St. Michael (BB)

(72) Inventor: Kurt Thomas Boden, Strangnas (SE)

(73) Assignee: MARVELL WORLD TRADE LTD., St. Michael (BB)

( * ) Notice: Subject to any disclaimer, the term of this patent is extended or adjusted under 35 U.S.C. 154(b) by 189 days.

(21) Appl. No.: 13/973,751

(22) Filed: Aug. 22, 2013

(65) Prior Publication Data

US 2014/0064271 A1  Mar. 6, 2014

Related U.S. Application Data

(60) Provisional application No. 61/694,483, filed on Aug. 29, 2012, provisional application No. 61/753,767, filed on Jan. 17, 2013.

(51) Int. Cl.
| | |
|---|---|
| *H04L 12/701* | (2013.01) |
| *H04L 12/721* | (2013.01) |
| *H04L 12/931* | (2013.01) |
| *H04L 12/727* | (2013.01) |

(52) U.S. Cl.
CPC .............. *H04L 45/44* (2013.01); *H04L 45/00* (2013.01); *H04L 45/121* (2013.01); *H04L 49/00* (2013.01)

(58) Field of Classification Search
CPC ..................................................... H04L 45/44
USPC . 370/389, 235, 238, 410, 412, 474; 709/213
See application file for complete search history.

(56) References Cited

U.S. PATENT DOCUMENTS

| | | | | |
|---|---|---|---|---|
| 4,665,484 A * | 5/1987 | Nanba | ....................... | G06F 9/52 711/153 |
| 6,460,174 B1 * | 10/2002 | Carey | ........................... | 716/104 |
| 6,529,983 B1 * | 3/2003 | Marshall et al. | ............. | 710/200 |
| 6,532,478 B1 * | 3/2003 | Matsubara | | |
| 6,542,926 B2 * | 4/2003 | Zalewski et al. | ............. | 709/213 |
| 6,549,961 B1 * | 4/2003 | Kloth | .............................. | 710/36 |
| 6,898,687 B2 * | 5/2005 | Wu et al. | ....................... | 711/173 |
| 6,973,521 B1 * | 12/2005 | Indiresan et al. | ............. | 710/200 |
| 7,099,275 B2 * | 8/2006 | Sarkinen et al. | ............. | 370/230 |
| 7,131,120 B2 * | 10/2006 | Veselov | ........................ | 717/164 |
| 7,219,342 B2 * | 5/2007 | Metzgen | ....................... | 717/156 |
| 7,233,182 B1 * | 6/2007 | Savoj | ............................ | 327/141 |
| 7,266,646 B2 * | 9/2007 | Vaidya et al. | ................. | 711/133 |
| 7,466,653 B1 * | 12/2008 | Cohen | ................... | H04L 49/253 370/235 |
| 7,743,191 B1 * | 6/2010 | Liao | .............................. | 710/240 |
| 7,757,070 B1 * | 7/2010 | Kang et al. | ................... | 712/228 |

(Continued)

*Primary Examiner* — Parth Patel

(57) ABSTRACT

A packet processing device has a plurality of processing stages, including a first processing stage and a second processing stage arranged as a packet processing pipeline. The first processing stage and the second processing stage each have a respective processor configured to process a packet of a packet stream and a respective resource manager having a respective local resource lock corresponding to a remote resource. The respective processor requests the respective resource manager to allocate the remote resource. The respective resource manager responds to the request to allocate the remote resource by locking the remote resource with the respective local resource lock and allocating the remote resource. The respective processor implements a packet processing operation associated with the allocated remote resource.

20 Claims, 8 Drawing Sheets

(56) References Cited

U.S. PATENT DOCUMENTS

| | | | |
|---|---|---|---|
| 7,996,642 B1* | 8/2011 | Smith | 711/167 |
| 8,127,262 B1* | 2/2012 | James-Roxby et al. | 716/110 |
| 8,332,831 B1* | 12/2012 | Metzgen | 717/149 |
| 8,688,922 B1* | 4/2014 | Assmann | 711/152 |
| 8,880,687 B1* | 11/2014 | Chandrachari | H04L 43/065 709/224 |
| 2002/0010793 A1* | 1/2002 | Noll et al. | 709/240 |
| 2002/0083149 A1* | 6/2002 | Van Huben et al. | 709/215 |
| 2002/0174305 A1* | 11/2002 | Vartti | 711/145 |
| 2002/0181440 A1* | 12/2002 | Norman et al. | 370/351 |
| 2003/0101307 A1* | 5/2003 | Gemelli et al. | 710/305 |
| 2003/0103499 A1* | 6/2003 | Davis et al. | 370/389 |
| 2004/0088488 A1* | 5/2004 | Ober et al. | 711/125 |
| 2005/0038964 A1* | 2/2005 | Hooper et al. | 711/143 |
| 2005/0076169 A1* | 4/2005 | Modelski et al. | 710/100 |
| 2005/0207387 A1* | 9/2005 | Middleton et al. | 370/347 |
| 2005/0235134 A1* | 10/2005 | O'Sullivan | 712/10 |
| 2006/0140119 A1* | 6/2006 | Yeh et al. | 370/235 |
| 2006/0171386 A1* | 8/2006 | Hesse et al. | 370/389 |
| 2006/0206635 A1* | 9/2006 | Alexander et al. | 710/22 |
| 2007/0174593 A1* | 7/2007 | Lenart | G06F 9/3838 712/220 |
| 2008/0219175 A1* | 9/2008 | Bedrosian | 370/250 |
| 2008/0244150 A1* | 10/2008 | Sharma | 710/316 |
| 2008/0282008 A1* | 11/2008 | Edirisooriya et al. | 710/117 |
| 2009/0080339 A1* | 3/2009 | Duffield et al. | 370/252 |
| 2009/0161685 A1* | 6/2009 | Du et al. | 370/412 |
| 2010/0208614 A1* | 8/2010 | Harmatos | 370/253 |
| 2011/0289180 A1* | 11/2011 | Sonnier et al. | 709/213 |
| 2011/0302345 A1* | 12/2011 | Boucard et al. | 710/123 |
| 2012/0011351 A1* | 1/2012 | Mundra et al. | 713/1 |
| 2012/0066432 A1* | 3/2012 | Miura | 711/102 |
| 2012/0079495 A1* | 3/2012 | Conti et al. | 718/104 |
| 2012/0117625 A1* | 5/2012 | Ray | 726/4 |
| 2012/0216012 A1* | 8/2012 | Vorbach et al. | 712/11 |
| 2013/0003556 A1* | 1/2013 | Boden et al. | 370/238 |
| 2013/0080672 A1* | 3/2013 | Tal | G06F 9/526 710/200 |
| 2013/0290976 A1* | 10/2013 | Cherkasova | G06F 9/5038 718/104 |
| 2013/0301408 A1* | 11/2013 | Boden | 370/230 |
| 2013/0315259 A1* | 11/2013 | Boden et al. | 370/412 |
| 2013/0316728 A1* | 11/2013 | Bradley | 455/456.1 |
| 2014/0064271 A1* | 3/2014 | Boden | 370/389 |
| 2014/0247835 A1* | 9/2014 | Nordmark et al. | 370/474 |

* cited by examiner

SEMAPHORE SOFT AND HARD HYBRID ARCHITECTURE

CROSS-REFERENCE TO RELATED APPLICATION

This application claims priority to and the benefit of U.S. Provisional Patent Application No. 61/694,483 filed Aug. 29, 2012, and U.S. Provisional Patent Application No. 61/753,767 filed Jan. 17, 2013, the disclosures of both of which are incorporated by reference herein in their entirety. This application is related in content to U.S. patent application Ser. No. 13/891,707 for "Hybrid Dataflow Processor," filed May 10, 2013, the entire disclosure of which is incorporated by reference herein in its entirety.

BACKGROUND

The present disclosure relates to a network device that processes packets.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

A pipeline-type packet processing device typically includes processing stages arranged to process packets in what is understood as a pipeline configuration. In a pipeline configuration, packets are processed in stages with packets progressing from stage to stage through the pipeline. In some packet processing pipelines, such as a dataflow packet processing pipeline, respective stages are programmable. A stage in the packet processing pipeline receives a packet that had been processed at one or more previous stages, along with a processing context for the packet. Various resources, such as for example various table lookups, that are to be used by the respective stages in a packet processing pipeline typically are provided by units that are external to the packet processing pipeline and that are accessed by the stages when those services are needed to perform a processing operation.

SUMMARY

One or more embodiments of the disclosure generally relate to a network device that processes packets through a number of processing stages. Some packet processing operations update, i.e., read and write a value in a remote resource such as a memory location in a table. This situation is also referred to as "read-modify-write." When the processing of a packet across multiple stages involves updating a remote resource, the possibility of contention for the remote resource, from packet processing operations implemented for prior or succeeding packets, is mitigated. According to example embodiments, when the processing of a given packet involves packet processing operations that will read from and subsequently write to a given remote resource, the remote resource is allocated or "locked" so that the processing of other packets cannot interfere with the remote resource until the processing carried out for the given packet reaches a point at which the remote resource is suitably released. Semaphores are used in example embodiments to lock corresponding remote resources. Notwithstanding the foregoing, not every example embodiment is required to possess all or even any of the features mentioned in this paragraph.

According to an aspect of the present disclosure, there is provided a packet processing device having processing stages, including a first processing stage and a second processing stage arranged as a packet processing pipeline; the first processing stage and the second processing stage each have: a respective processor configured to process a packet of a packet stream, and a respective resource manager having a respective local resource lock corresponding to a remote resource; the respective processor is configured to request the respective resource manager to allocate the remote resource; the respective resource manager is further configured to respond to the request to allocate the remote resource by locking the remote resource with the respective local resource lock and allocating the remote resource; the respective processor is further configured to implement a packet processing operation associated with the allocated remote resource.

According to another example embodiment, a packet processing device includes: processing stages arranged as a packet processing pipeline; the processing stages each having processor cores and buffers; the processor cores and buffers of the processing stages defining a plurality of paths, for simultaneous packet processing, through the packet processing pipeline; an ingress front end configured to direct each packet of an incoming stream of packets into one of the plurality of paths; the paths including a hard path and a soft path, the hard path being configured to process received ones of the incoming stream of packets with fixed latency, the soft path being configured to process received ones of the incoming stream of packets with variable latency; and the processing stages each further including a respective resource manager configured to request allocation of a remote resource, for a given packet of the incoming stream of packets, in response to an instruction from one of the processor cores. According to another example embodiment, the respective resource manager is further configured to allocate an available remote resource, thereby making the remote resource accessible only to the respective packet and to subsequent packet processing operations for that packet. Also, the processing stages are further configured, in an example embodiment, to both request the release of a allocated resource, and to receive from another processing stage a request to release an allocated resource and subsequently to release the resource. A remote resource which has been released is available to be allocated.

In yet another example embodiment, a packet processing method includes receiving, at a processor of a first processing stage, a first packet and a request for allocation of a remote resource; responding, by the processor, to the allocation request, by setting a semaphore corresponding to the remote resource to indicate a locked status; implementing a first packet processing operation, in association with the allocated remote resource, and in association with the first packet, to obtain a processed first packet; and outputting the processed first packet to a next processing stage of the pipeline packet processing device.

DETAILED DESCRIPTION OF EXEMPLARY EMBODIMENTS

Figure 1:
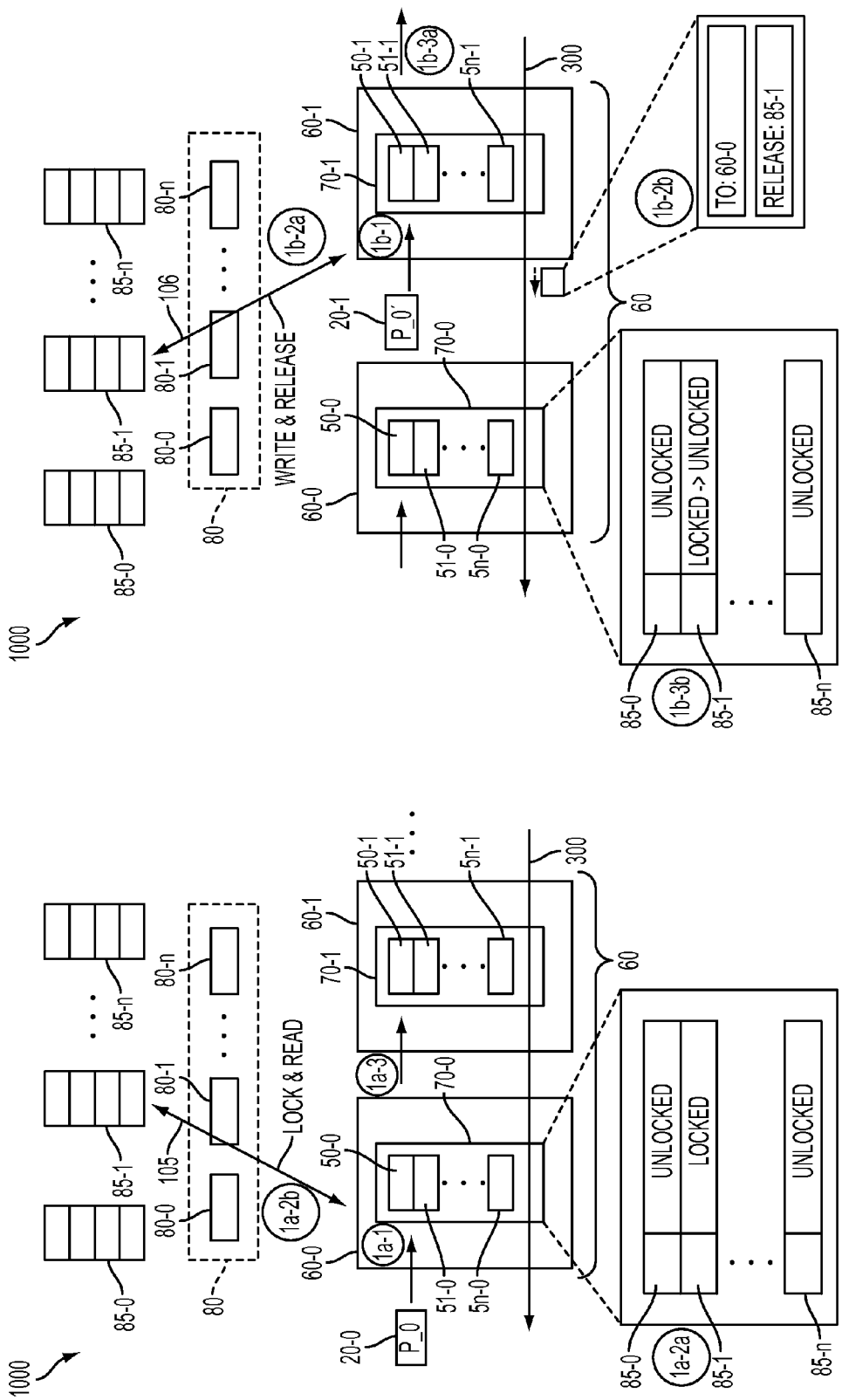
FIG. 1A is a highly simplified illustrative drawing showing a concept of operation according to example embodiments.
FIG. 1B is a highly simplified illustrative drawing showing another concept of operation according to example embodiments.

In the following discussion, descriptions of well-known functions and constructions may be omitted for increased clarity and conciseness.

FIG. 1A shows a Packet Processing Device (1000). Packet Processing Device (1000) includes a Plurality of Processing Stages (60), including a First Processing Stage (60-0), a Second Processing Stage (60-1), and other processing stages in accordance with particular example embodiments. Here, the terms "first" and "second" do not connote that the First Processing Stage (60-0) is limited to being the first processing stage in a pipeline configuration, nor that the Second Processing Stage (60-1) is limited to being the second processing stage in the pipeline configuration. Instead, "first" and "second" simply indicate a relative order in the pipeline configuration such that the First Processing Stage (60-0) is relatively earlier along the pipeline configuration than is the Second Processing Stage (60-1). In this discussion and in the drawing figures, the First Processing Stage (60-0) and Second Processing Stage (60-1) are illustrated adjacent each other in the pipeline configuration, but this arrangement is merely an example embodiment, and other processing stages are interposed between the First Processing Stage (60-0) and the Second Processing Stage (60-1) in example embodiments. Further, the First Processing Stage (60-0) is considered to be "upstream" with respect to the Second Processing Stage (60-1). Likewise, the Second Processing Stage (60-1) is considered to be "downstream" with respect to the first processing stage, according to an example embodiment. In an embodiment the packet processing device (1000) is configured as a dataflow pipeline in which the respective stages (60) are programmable, and in which packets are received for processing at a downstream processing stage along with a processing context for processing the corresponding received packet. In an alternative example embodiment, one or more individual stages of the Plurality of Processing Stages (60) are not programmable but have hard-coded functionality. In yet another example embodiment, the Plurality of Processing Stages (60) includes some programmable processing stages and some hard-coded processing stages.

Each of the Plurality of Processing Stages (60) is substantially the same from a hardware perspective, according to an example embodiment. In another example embodiment, the Plurality of Processing Stages (60) includes different types of processing stages. The discussion below assumes that each of the Plurality of Processing Stages (60) has the same hardware structure. The components of each processing stage are described in more detail below. At the present, however, it is noted that each of the Plurality of Processing Stages (60) includes a respective Pool of Resource Locks (70). The respective Pool of Resource Locks (70) for the First Processing Stage (60-0) is shown as Pool of Resource Locks (70-0). Likewise, the respective Pool of Resource Locks (70) for the Second Processing Stage (60-1) is shown as Pool of Resource Locks (70-1). Each of the Plurality of Processing Stages (60) has a respective Pool of Resource Locks (70), according to example embodiments.

Within each respective Pool of Resource Locks (70) there exists a plurality of semaphores. In the present example embodiment, the semaphores are represented as Local Resource Locks (50, 51, . . . 5n). The number of semaphores used depends on particular implementation details, and FIG. 1 shows only a few semaphores within a Pool of Resource Locks (70) for the sake of simplicity of illustration. Each respective Pool of Resource Locks (70) includes its own Local Resource Locks (50, 51, . . . 5n). The Pool of Resource Locks (70-0) for First Processing Stage (60-0) includes Respective Local Resource Lock (50-0), Respective Local Resource Lock (51-0), . . . and Respective Local Resource Lock (5n-0). Likewise, the Pool of Resource Locks (70-1) for Second Processing Stage (60-1) includes Respective Local Resource Lock (50-1), Respective Local Resource Lock (51-1), . . . and Respective Local Resource Lock (5n-1).

Also shown in FIG. 1A are a Plurality of Remote Resources (85) including Remote Resource (85-0), Remote Resource (85-1), . . . and Remote Resource (85-n). Together, these represent remote resources that are available for READ and WRITE operations carried out by the Plurality of Processing Stages (60). In an example embodiment, the remote resources are memory locations that contain data such as, in a system for processing packets received on a network, forwarding tables, policy tables, MAC address learning, time-out management, and the like. This example is non-limiting, however, and the remote resources according to other exemplary embodiments contain data in structures other than tables. In an example embodiment, a remote resource contains a value which is accessed by either a READ or a WRITE Operation. In a READ Operation, a Processing Stage obtains a value stored in a memory location of the remote resource. In a WRITE Operation, the Processing Stage stores a value into the memory location of the remote resource. It is to be noted, however, that a remote resource may be locked by a process intended to subsequently perform alternate operations in addition to READ and WRITE operations, for example updating or synchronizing multiple tables and/or memory locations.

Between the Plurality of Processing Stages (60) and the Plurality of Remote Resources (85) is illustrated a Plurality of Engines (80). In an example embodiment, a Processing Stage requires an Engine to access a Remote Resource. In other example embodiments, however, the Plurality of Processing Stages (60) are able to access the Plurality of Remote Resources (85) directly or without the use of an Engine. According to another example embodiment, a given Remote Resource is accessed through a combination of engines.

At the lower portion of FIG. 1A, there is illustrated a more detailed view of the Pool of Resource Locks (70-0) of the First Processing Stage (60-0), according to an example embodiment. This more detailed representation of the Pool of Resource Locks (70-0) is shown as a table containing two columns. Each row of the table represents a Local Resource Lock such as Respective Local Resource Lock (50-0), Respective Local Resource Lock (51-0), . . . Respective Local Resource Lock (5n-0). The left column of the table includes, in each row, an identifier of a corresponding one of the Plurality of Remote Resources (85). The right-column of the table indicates the status of the corresponding Remote Resource. In this non-limiting, simplified example the status is UNLOCKED or LOCKED. The table of FIG. 1A indicates that, in this example, the Remote Resource (85-0) is UNLOCKED, the Remote Resource (85-1) is LOCKED, and the Remote Resource (85-n) is UNLOCKED.

In the example embodiment shown in FIG. 1A, the Processing Stages are connected to a Resource Release Bus (300), also referred to as a lock release message path. The Resource Release Bus (300) allows for communication, such as message exchange, among the Plurality of Processing Stages (60). According to an example embodiment, the Resource Release Bus (300) allows for messages to be passed from upstream stages to downstream stages. The Resource Release Bus (300), however, is implemented in other ways according to example embodiments, and a bus that permits message exchange is a non-limiting example. In the present example embodiment, the Resource Release Bus (300) does not carry the packets being processed through the pipeline configuration.

A single Packet (20-0) is shown in FIG. 1A, for simplicity of illustration. The Packet (20-0) enters the First Processing Stage (60-0), and will pass to the Second Processing Stage (60-1) after any packet processing operations programmed into the First Processing Stage (60-0) are concluded.

FIG. 1A also illustrates part of an overall concept of operation according to an example embodiment. In particular, 1a-1 indicates the entering of Packet (20-0) into the First Processing Stage (60-0). At this instant, all locks of the Pool of Resource Locks (70-0) have an UNLOCKED status. The packet processing operations programmed into the First Processing Stage (60-0) include, for example, a READ of Remote Resource (85-1). Before carrying out the READ operation, however, the packet processing operations programmed into First Processing Stage (60-0) carry out a check to determine whether Remote Resource (85-1) is in a LOCKED or in an UNLOCKED status. To make this determination the Pool of Resource Locks (70-0) is checked. More particularly, the particular Respective Local Resource Lock (51-0) corresponding to Remote Resource (85-1) is checked. At 1a-2a, Finding the Respective Local Resource Lock (51-0) has an UNLOCKED status, the First Processing Stage (60-0) sets the Respective Local Resource Lock (51-0) to a LOCKED status. At 1a-2b, having locked Respective Local Resource Lock (51-0), the First Processing Stage (60-0) carries out the READ operation with respect to Remote Resource (85-1) using an appropriate one of the Plurality of Engines (80). The value of Remote Resource (85-1) is thus read by the First Processing Stage (60-0) and this value is now available to use in accordance with the processing programmed into First Processing Stage (60-0) and others of the Plurality of Processing Stages (60). At 1a-3, the Packet (20-0) is transferred to Second Processing Stage (60-1), together with other information to be described later.

In this example embodiment, the setting of the status of Respective Local Resource Lock (51-0), corresponding to Remote Resource (85-1), from UNLOCKED to LOCKED, implements a locking of the remote resource. To put it another way, the Respective Local Resource Lock (51-0) acts as a semaphore that indicates that Remote Resource (85-1) is an allocated remote resource.

It is noted that, in an embodiment the mechanism for locking Remote Resource (85-1) and the mechanism for subsequent reading of the value of Remote Resource (85-1) are both located and activated locally within the First Processing Stage (60-0). If, for example, in contrast, semaphores were to be maintained in a shared pool of semaphores located outside the First Processing Stage (60-0), delays in making the determination as to the LOCKED or UNLOCKED status of Remote Resource (85-1) would likely result. Although maintaining a shared pool of semaphores (not shown) streamlines some aspects of the processor architecture, in an example embodiment, one of the Plurality of Engines (80) would need to obtain LOCKED or UNLOCKED status information from such a shared pool of semaphores.

Since the locking of Remote Resource (85-1) and the subsequent reading of the value of Remote Resource (85-1) take place within the First Processing Stage (60-0), within a very short time of each other, it is noted that the lock and read operations constitute a Lock & Read Operation (105). It is further noted that the Lock & Read Operation (105) allocates the Remote Resource (85-1) by setting a value of Respective Local Resource Lock (51-0), thereby preventing First Processing Stage (60-0) from carrying out any operations with respect to Remote Resource (85-1) until the status of Remote Resource (85-1) in Respective Local Resource Lock (51-0) goes from LOCKED to UNLOCKED.

It is noted that, in First Processing Stage (60-0), the Lock & Read Operation (105) includes a READ operation with respect to the allocated Remote Resource (85-1). This READ operation is understood to constitute a packet processing operation associated with the allocated Remote Resource (85-1).

Having thus described an overall concept of operation for the Lock & Read Operation (105), the discussion will proceed to a further concept of operation relating to a Write & Release Operation (106).

At 1a-3 of FIG. 1A, Packet (20-0) completed processing at and exits from the First Processing Stage (60-0). This packet, prior to undergoing the processing programmed into First Processing Stage (60-0), is understood to constitute a first packet. At 1a-3, however, this packet is understood to constitute a processed first packet. In some circumstances, depending on the processing programmed into the given processing stage, the Packet (20-0) changes. Such changes, however, are not strictly required, and in some situations the Packet (20-0) stays the same. Therefore, it is noted that the processing programmed into First Processing Stage (60-0), performed with respect to the first packet, results, in any event, with the passing along of a processed first packet.

Turning to FIG. 1B, Packet (20-1) represents a second packet. At 1b-1, the Packet (20-1) is passed to Second Processing Stage (60-1). In this example, the Packet (20-1) is a packet which, in a prior processing stage, resulted in the locking of a remote resource such as Remote Resource (85-1). For the sake of this discussion, Packet (20-1) is the processed first packet which exits from First Processing Stage (60-0) at 1a-3.

In FIG. 1B, at 1b-2a, the processing programmed into Second Processing Stage (60-1) causes a WRITE operation to be carried out with respect to Remote Resource (85-1). Having concluded the WRITE operation, it is suitable to release the Remote Resource (85-1). At 1b-2b, to effect the release of Remote Resource (85-1), Second Processing Stage (60-1) sends a Resource Lock Release Request over Resource Release Bus (300). As shown in FIG. 1B, the Resource Lock Release Request includes two items of information. One item of information in the Resource Lock Release Request is an identifier of the one of the Plurality of Processing Stages (60) that has the Respective Local Resource Lock (50-1) corresponding to the locked Remote Resource (85-1). The other item of information is an identifier of the particular local resource lock (here, Respective Local Resource Lock (50-1)) to be released.

Since the Resource Release Bus (300) needs to carry the Resource Lock Release Request only to upstream ones of the Plurality of Processing Stages (60), the Resource Release Bus (300) communicates in one direction, e.g. the upstream direction, in an example embodiment.

At 1b-3a, the packet Packet (20-1) exits from the Second Processing Stage (60-1) as a processed second packet and enters into a subsequent one of the Plurality of Processing Stages (60).

At 1b-3b, the First Processing Stage (60-0) receives the Resource Lock Release Request addressed to the First Processing Stage (60-0), and changes the status of Remote Resource (85-1) in Respective Local Resource Lock (51-0) of the Pool of Resource Locks (70-0) by replacing LOCKED with UNLOCKED (illustrated as "LOCKED->UNLOCKED" in FIG. 1B). After the status of Remote Resource (85-1) is updated in Respective Local Resource Lock (51-0), the Remote Resource (85-1) is no longer locked, and is available to be allocated for use in a packet processing operation for another packet.

Since the WRITE operation and the subsequent sending of the Resource Lock Release Request take place within the Second Processing Stage (60-1), within a very short time of each other, it is noted that these two actions constitute a Write & Release Operation (106). It is further understood that the Write & Release Operation (106) releases, or deallocates the Remote Resource (85-1) by causing the First Processing Stage (60-0) to set a value of its Respective Local Resource Lock (51-0), thereby enabling First Processing Stage (60-0) to carry out operations with respect to Remote Resource (85-1) if necessary.

In an example embodiment the Resource Lock Release Request is understood to constitute, more generally, a release request message.

In an example embodiment, the status of one of the Plurality of Remote Resources (85) is represented in an alternative manner, such as a single binary digit with one value representing a LOCKED status, and the other value representing an UNLOCKED status. Other implementations of the Pool of Resource Locks (70-0) are within the ability of a person familiar with this field. Further, the implementation of semaphores may be substituted with other locking mechanisms familiar to those skilled in the art including a single client lock such as a mutex or the like.

According to an example embodiment, therefore, local locks are used to restrict the accessibility of a remote resource to the processing for a single packet, along the respective processing stages. According to an example embodiment, the First Processing Stage (60-0) reads from the Remote Resource (85-1) and passes the Packet (20-0) to the Second Processing Stage (60-1) as the Packet (20-1). The Second Processing Stage (60-1) then writes a value to the Remote Resource (85-1). The semaphore (Respective Local Resource Lock (50-1)) allows exclusive access by the Second Processing Stage (60-1) for the purpose of writing. However, without such a semaphore, the Second Processing Stage (60-1) would not be guaranteed exclusive access to the Remote Resource (85-1). That is to say, the First Processing Stage (60-0) would have the opportunity, in response to a new packet requiring the same Remote Resource (85-1), to begin reading from the Remote Resource (85-1) while the Second Processing Stage (60-1) is beginning to write to the Remote Resource (85-1), resulting in possible problems due to such contention. The use of semaphores, in Packet Processing Device (1000), thus avoids such contention problems.

Figure 2:
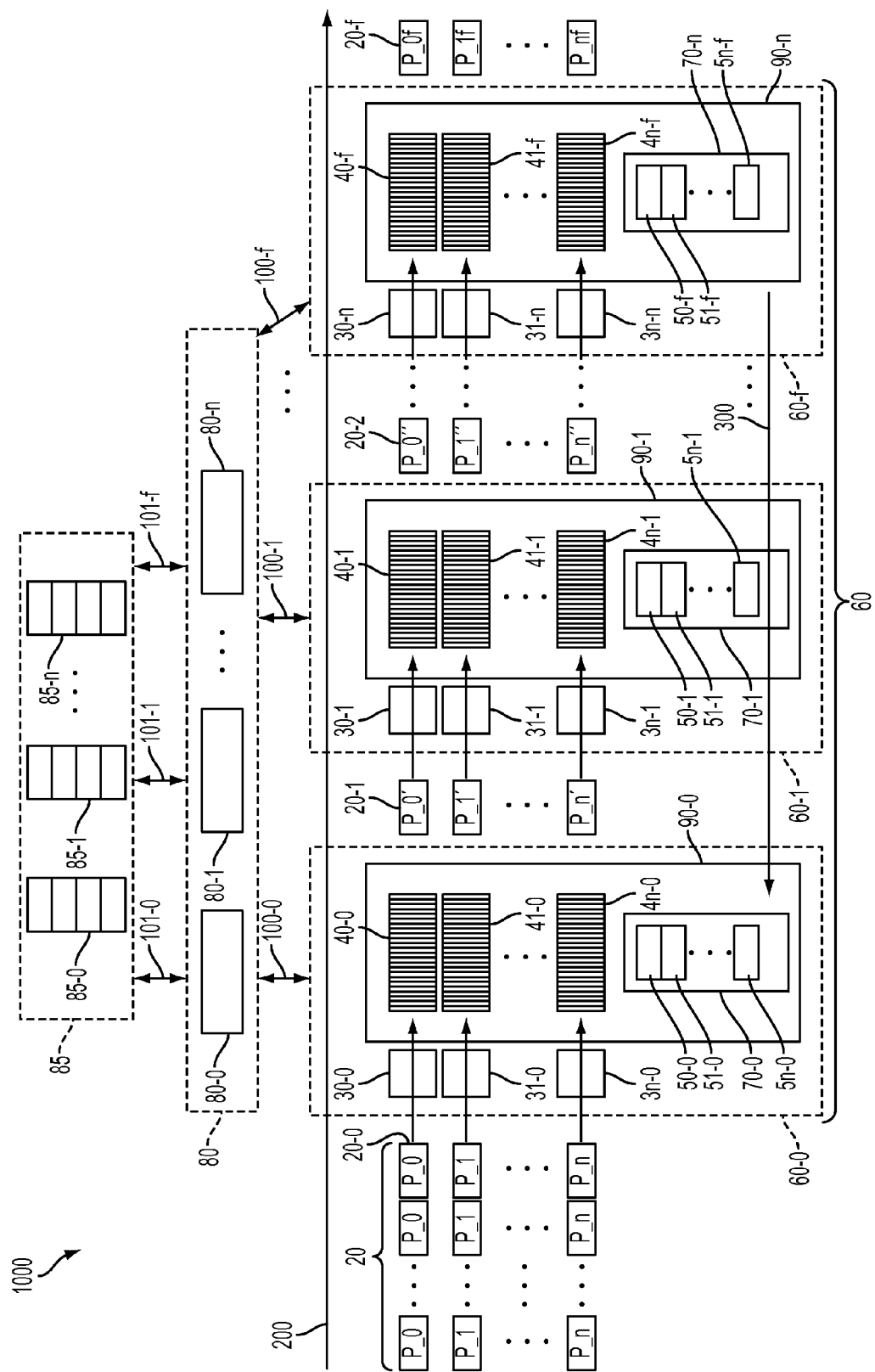
FIG. 2 is a highly simplified schematic diagram of a device according to example embodiments.

FIG. 2 shows a more detailed view of the Packet Processing Device (1200). In FIG. 2, the Plurality of Processing Stages (60) includes First Processing Stage (60-0), Second Processing Stage (60-1), other processing stages, and Final Processing Stage (**60-*f***).

The Plurality of Engines (80) includes Engine (80-0), Engine (80-1), other engines, and Engine (**80-*n*). These engines, according to an example embodiment, are input/output (I/O) processors that can interface with appropriate ones of the Plurality of Remote Resources (85) on behalf of the Plurality of Processing Stages (60). The Plurality of Processing Stages (60) communicate with the Plurality of Engines (80) through communication paths that are understood to constitute Engine Connections (100-0, -1 . . . -*f*). The Plurality of Engines (80) communicate with the Plurality of Remote Resources (85) through communication paths that are understood to constitute Engine to Resource Connections (101-0, -1, . . . , -*f***). The engine connections and the engine to resource connections are implemented, in an example embodiment, by an interconnect or other suitable connections.

Each of the Plurality of Processing Stages (60) is substantially similar from a hardware point of view. Taking the First Processing Stage (60-0) as an example, the processing stage includes one or more Respective Processors (**30-0, 30-1, . . . 3*n*-0). Each processor is configured to accept a packet such as Packet (20-0) from a Plurality of Parallel Packet Streams (20**).

The First Processing Stage (60-0) further includes a Respective Resource Manager (90-0) having Buffers (**40-0, 41-0, . . . 4*n*-0). The Respective Resource Manager (90-0) of the First Processing Stage (60-0) further includes the Pool of Resource Locks (70-0) and the Respective Local Resource Locks (50-0, 51-0, . . . 5*n*-0**).

The First Processing Stage (60-0) is configured to receive the Packet (20-0) of a Plurality of Parallel Packet Streams (20). Although the packets of the Plurality of Parallel Packet Streams (20) are shown entering First Processing Stage (60-0) in a parallel fashion, the actual circuitry over which packets travel need not actually be implemented in such a manner. In FIG. 2, there is shown a Packet Bus (200) along which each packet travels, according to an example embodiment.

As previously mentioned in the context of FIGS. **1*a*, 1*b*, and further below in FIG. 3 which will be discussed momentarily, each of the Plurality of Processing Stages (60) is configured to implement a Lock & Read Operation (105), to implement a Write & Release Operation (106), to accept a Resource Lock Release Request received over the Resource Release Bus (300), and, subsequently, to release the indicated Resource Lock. According to an example embodiment, the First Processing Stage (60-0) is configured, in accordance with the processing programmed the stage, and in response to the entrance of Packet (20-0), to allocate the Remote Resource (85-0) by locking Respective Local Resource Lock (51-0) of the Pool of Resource Locks (70-0**), i.e., the Lock Operation.

The First Processing Stage (60-0) is further configured to perform the Read Operation, through its Respective Resource Manager to Engine Connection (100-0), through Engine (80-0), and via Engine to Resource Connection (101-0) to Remote Resource (85-0). The First Processing Stage (60-0) is yet further configured to pass Packet (20-0) along the Packet Bus (200) as Packet (20-1).

The Second Processing Stage (60-1) is configured, in response to receiving Packet (20-1), to perform the Write Operation, through Respective Resource Manager to Engine Connection (100-1), Engine (80-1), to Engine to Resource Connection (101-0), and to Remote Resource (85-0). The Second Processing Stage (60-1) is further configured to pass the Packet (20-1) along the Packet Bus (200) as Packet (20-2). The Second Processing Stage (60-1) is yet further configured to request the release of Remote Resource (85-0) by causing the unlocking of the Respective Local Resource Lock (51-0), i.e., the Release Operation. To cause the unlocking, the Second Processing Stage (60-1) sends, along Resource Release Bus (300), a release request containing identifiers indicating the First Processing Stage (60-0) and its particular Respective Local Resource Lock (51-0). The First Processing Stage (60-0) is configured to receive the release request and to subsequently unlock the Respective Local Resource Lock (51-0), thereby deallocating the Remote Resource (85-0). The Remote Resource (85-0) is then available for subsequent allocation.

Figure 3:
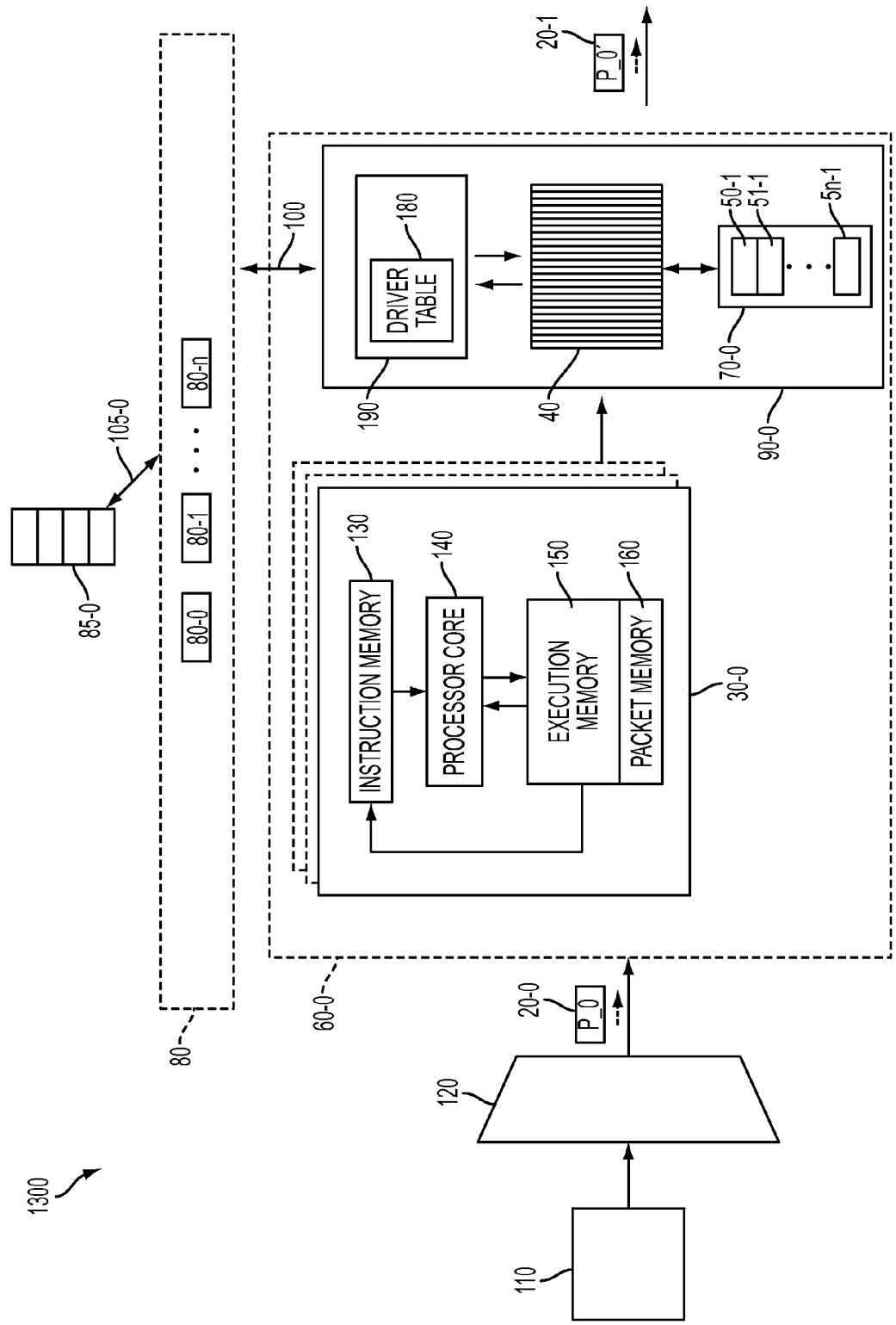
FIG. 3 is a highly simplified schematic diagram showing a particular aspect of a device according to example embodiments.

FIG. 3 illustrates an example embodiment of a Packet Processing Device (1300). The Packet Processing Device (1300) includes a Receiver (110) for receiving packets, an Interface Arbiter (120) for directing packets along suitable paths through the pipeline configuration, a First Processing Stage (60-0) of a Plurality of Processing Stages (60), a Plurality of Engines (80), and a Remote Resource (85-0) of a Plurality of Remote Resources (85). The Receiver (110) receives a Packet (20-0) and subsequently passes the Packet (20-0) to the Interface Arbiter (120). The Interface Arbiter (120) directs the Packet (20-0) into the First Processing Stage (60-0). The Interface Arbiter (120) is also referred to as in ingress front end, in example embodiments.

The First Processing Stage (60-0) includes a Respective Processor (30-0). The Respective Processor (30-0) includes a Packet Memory (160), an Execution Memory (150), an Instruction Memory (130), and a Processor Core (140). The Respective Processor (30-0) is configured to perform an operation consistent with the operations already described with respect to FIG. 1A and FIG. 1B, namely, a Lock & Read Operation (105) and a Write & Release Operation (106).

The Packet Memory (160) stores a packet from the Plurality of Parallel Packet Streams (20). The Execution Memory (150) stores information related to the processing of the packet such as, for example, variable values and an indication as to whether one or more of the Plurality of Remote Resources (85) is allocated for the processing of the packet. When a packet exits from the First Processing Stage (60-0) to the Second Processing Stage (60-1), the contents of both the Packet Memory (160) and the Execution Memory (150) are passed along, according to an example embodiment, as an Execution Context.

The Processor Core (140) carries out operations in accordance with the contents of the Instruction Memory (130). The particular operations carried out depend on the type of packet being processed. In example embodiments the Processor Core (140) has been discussed in the context of programmable operations; it is noted that Processor Core (140) may be implemented multiple manners, such as a programmable processor core or as a hardware-designed processor core.

As shown in FIG. 3, multiple instances of Respective Processor (30-0) are provided in another example embodiment. The presence of multiple instances of Respective Processor (30-0) make it possible to carry out a number of operations within the First Processing Stage (60-0) before the packet is provided to the Second Processing Stage (60-1). According to an example embodiment, the multiple instances of Respective Processor (30-0) carry out a packet processing operation associated with a single packet. According to another example embodiment, the multiple instances of Respective Processor (30-0) carry out a packet processing operation associated with multiple packets. According to yet another example embodiment, packet processing operations are performed on packets in different streams, depending on the particular processing context.

The First Processing Stage (60-0) further includes a Respective Resource Manager (90-0) which includes a Buffer (40), a Pool of Resource Locks (70-0), and an I/O Access Unit (190). The Buffer (40) stores the Packet Memory (160) and the Execution Memory (150) for packets whose processing involves access to any of the Plurality of Remote Resources (85).

The I/O Access Unit (190) further includes a Driver Table (180) utilized in the accessing of the Plurality of Engines (80) and, in some example embodiments, the Remote Resource (85-0).

The First Processing Stage (60-0) communicates with the Plurality of Engines (80) by a Respective Resource Manager to Engine Connection (100-0), which then communicates with the Remote Resource (85-0) by an Engine to Resource Connection (105-0).

A more detailed architecture that is suitable for implementing one of the Plurality of Processing Stages (60), according to an example embodiment, is described in Jakob Carlstrom, and Thomas Boden, "Synchronous Dataflow Architecture for Network Processors," *IEEE MICRO*, (September-October 2004), the content of which is incorporated in its entirety herein for its useful description and example architecture. An additional architecture is found in the disclosure of U.S. patent application Ser. No. 13/891,707 for "Hybrid Dataflow Processor," filed May 10, 2013, owned by the same assignee and incorporated herein by reference for its useful descriptions and example architectures including descriptions of both hard and soft path packet processing operations.

Figure 4:
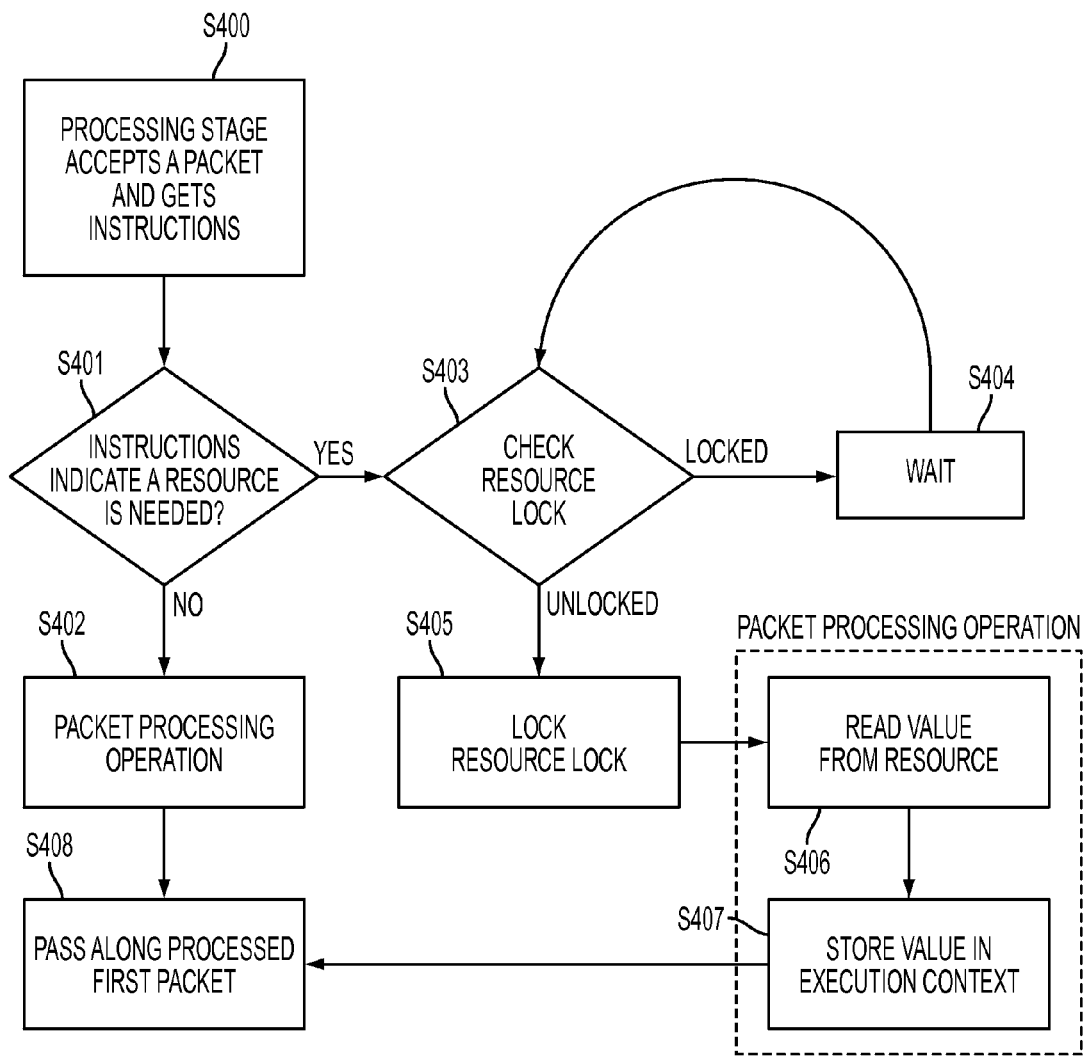
FIG. 4 is a flow diagram of an example method according to example embodiments.

FIG. 4. is a flow diagram of an example method according to example embodiments. S400 occurs when some Processing Stage accepts a Packet. The Processing Stage will read the Execution Context of the Packet and obtain Instructions based on the Execution Context. At S401, the Processing Stage will determine whether a Remote Resource is needed, in accordance with the Instructions.

If at S401a Remote Resource is not needed, the Processing Stage will determine what other Packet Processing Operation to be performed. At S402, the thus-determined Packet Processing Operation is performed. At S408, the Packet is passed along the Packet Processing Pipeline as a Processed First Packet.

If at S401 the Instructions indicate that a Remote Resource is needed, at S403 the Processing Stage will check to see if a Resource Lock is available for the needed Remote Resource.

If at S403 the Resource Lock is unavailable, i.e., in a LOCKED status as indicated by the corresponding Respective Local Resource Lock, at S404 the Processing Stage waits until the Resource Lock becomes available, and the Packet remains buffered in Buffer (40).

If at S403 the Resource Lock is available, i.e., in an UNLOCKED status, the Processing Stage at S405 locks the Local Resource Lock by setting the status to LOCKED, and then carries out a Packet Processing Operation in accordance with the Instructions. According to an example embodiment, the information, that the Local Resource Lock has been set to the status of LOCKED, travels as part of the execution context of the packet which is passed from the Processing Stage, at S408.

More particularly, at S406, the Processing Stage accesses the allocated Remote Resource, through an Engine, to Read a value from the Remote Resource. At S407, the value thus read is stored in the Packet's Execution Context. At S408, the Processed First Packet is passed along the pipeline configuration to a subsequent Processing Stage.

Figure 5:
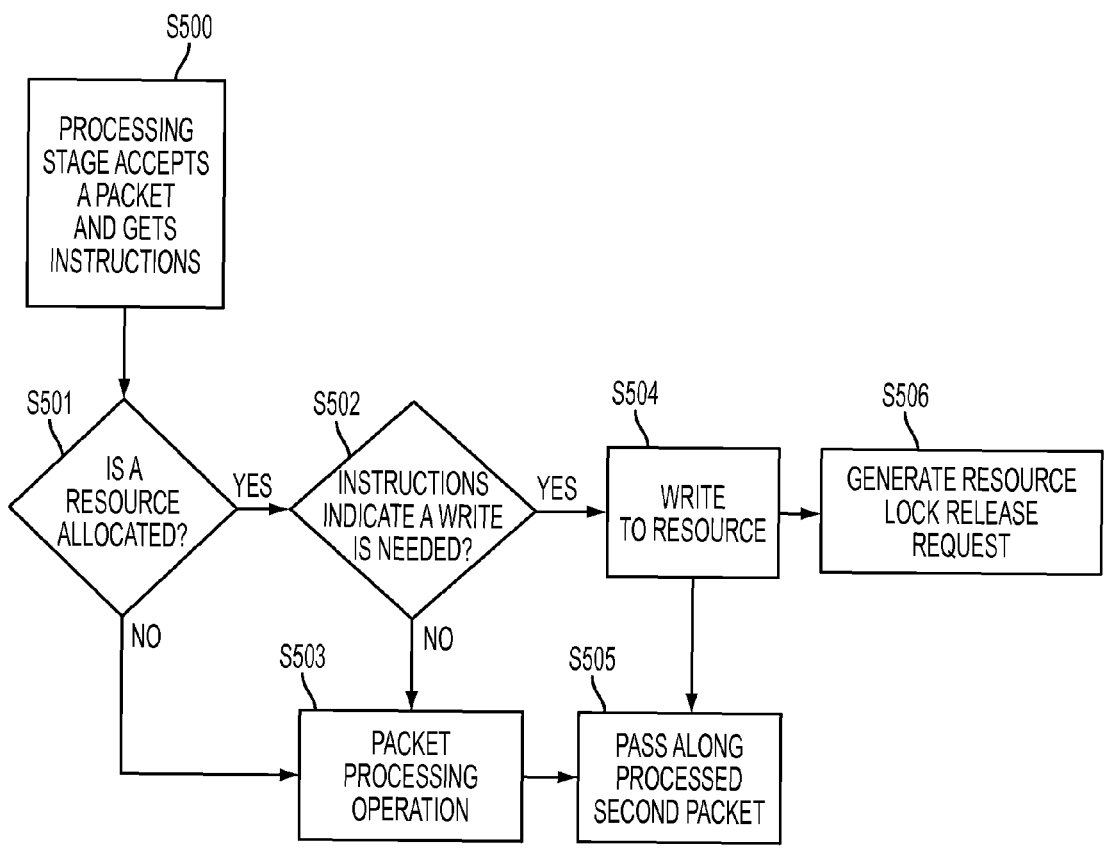
FIG. 5 is a flow diagram of an example method according to example embodiments.

FIG. 5. is a flow diagram of an example method according to example embodiments. The example method of FIG. 5 may be applied to multiple example embodiments as discussed and as understood by one of ordinary skill in the art. S500 occurs when a Processing Stage accepts a Packet. The Processing Stage reads the Execution Context of the Packet and obtains Instructions based on the Execution Context. At S501, the Processing Stage determines whether a Resource is already Allocated in association with the received Packet.

At S501, if a Resource is not allocated, at S503 some Packet Processing Operation will be carried out in accordance with the Instructions. The Packet will then be passed along the Packet Processing Pipeline as a Processed Second Packet.

At S501, if a Resource is allocated, at S502 the Processing Stage will then determine whether the Instructions indicate a WRITE Operation is needed.

At S502, if a WRITE Operation is not needed, at S503 some other Packet Processing Operation is carried out in accordance with the Instructions.

At S502, if a WRITE Operation is needed, at S504 the Processing Stage carries out a WRITE operation with respect to the Allocated Resource. The Processing Stage then causes both S505 and S506 to occur.

At S505, the Processing Stage pass along the Processed Second Packet, S505. At S506, the Processing Stage generates and sends, along the Resource Release Bus, a Resource Lock Release Request containing Identifiers of the Respective Resource Manager and of the particular Resource Lock to be released.

Figure 6:
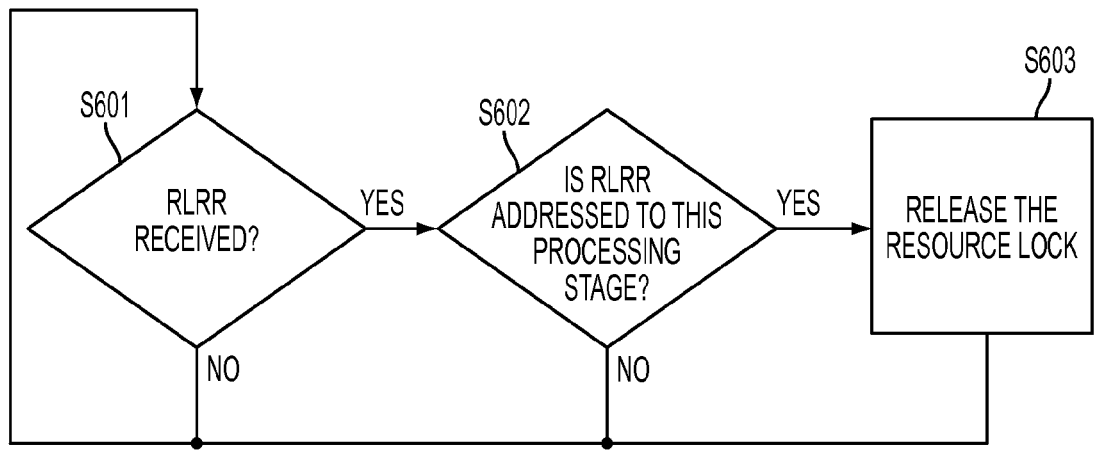
FIG. 6 is a flow diagram of an example method according to example embodiments.

FIG. 6. is a flow diagram of an example method according to example embodiments. Each Processing Stage is configured to monitor the Resource Release Bus (300) for any Resource Lock Release Request. S601 represents continuous monitoring of the Resource Release Bus (300) until a Resource Lock Release Request (RLRR) is received.

At S601, when a Processing Stage does receive a Resource Lock Release Request, the Processing Stage determines at S602 whether the Resource Lock Release Request is addressed to that Processing Stage.

At S602, when the Processing Stage determines that the Resource Lock Release Request does not indicate the address of that Processing Stage, the Resource Lock Release Request is ignored.

At S602, when a Processing Stage determines that the Resource Lock Release Request does indicate the address of that Processing Stage, at S603 the Resource Lock Release Request is implemented so as to release whichever Local Resource Lock is identified in the Resource Lock Release Request.

It is to be noted that, in an example embodiment, the use of the Local Resource Lock within the Processing Stage allows the treatment of multiple engines as a single resource. In such an example embodiment, multiple engines are locked by setting the status of a single Local Resource Lock to LOCKED.

Figure 7:
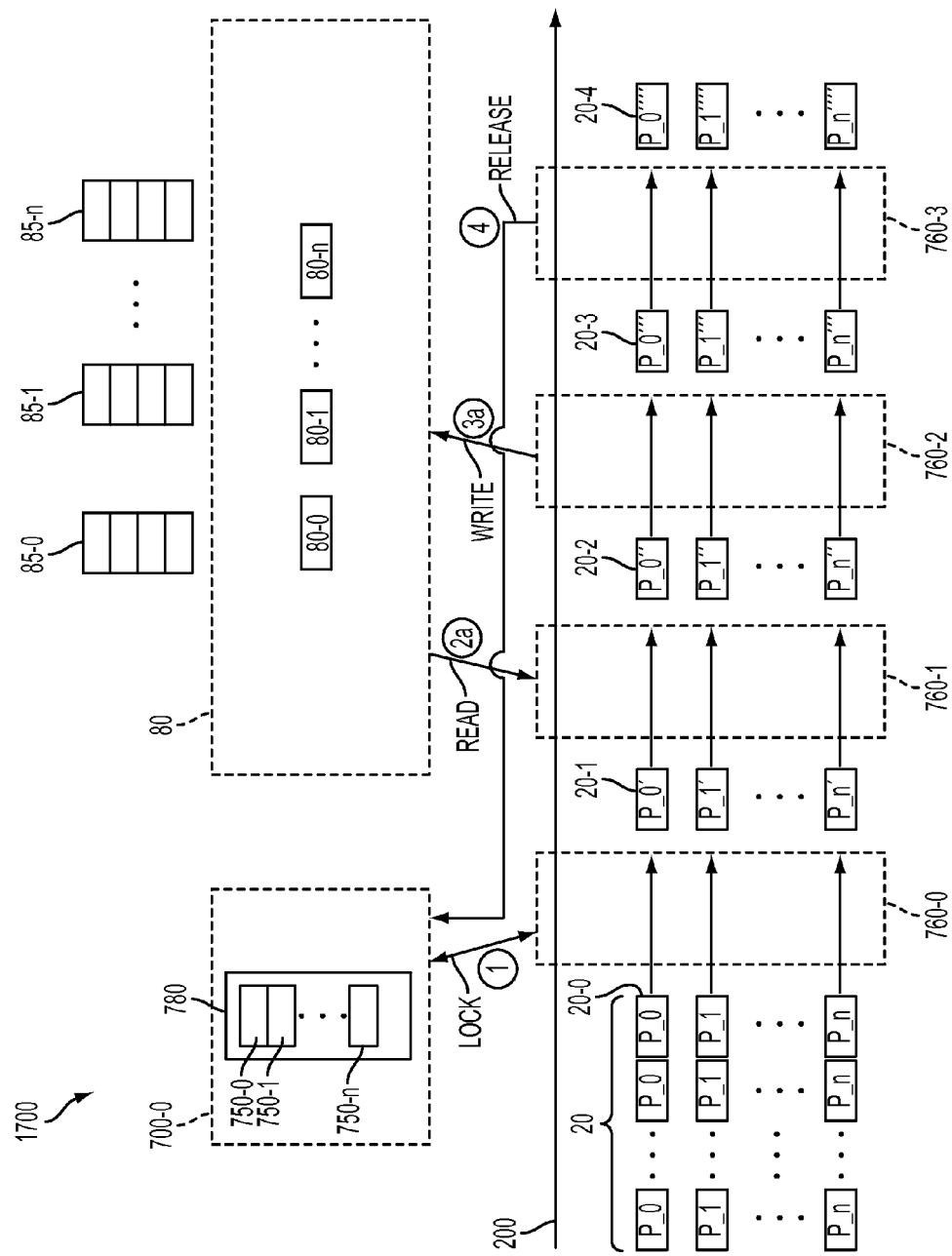
FIG. 7 is a highly simplified schematic diagram of a device according to example embodiments.

FIG. 7 is a highly simplified schematic diagram of a device according to example embodiments, in which the Resource Locks are centrally managed by a Central Resource Lock Engine (700-0). In FIG. 7, a Packet Processing Device (1700) includes a Packet Bus (200), a Plurality of Packet Streams (20), a Plurality of Engines (80), a plurality of Remote Resources (85-0, 85-1, ... 85-$n$), a First Processing Stage (760-0), a Second Processing Stage (760-1), a Third Processing Stage (760-2), a Fourth Processing Stage (760-3), a Central Resource Lock Engine (700-0). The Central Resource Lock Engine (700-0) includes a Central Resource Lock Pool Local to Engine (780) which further includes an Engine Local Resource Lock (750-0, 750-1, ... 750-$n$).

According to this example embodiment, the LOCK, READ, WRITE, and RELEASE Operations are each implemented by a separate Processing Stage. In response to a request for a resource designated by a Packet (20-0), the First Processing Stage (760-0) determines if a Central Resource Lock Pool Local to Engine (780) contains an Engine Local Resource Lock (750-0, 750-1, ... 750-$n$) capable of locking some requested Resource. If available, the First Processing Stage (760-0) LOCKs the Resource. The First Processing Stage (760-0) passes Packet (20-0) along the Packet Bus (200) to the Second Processing Stage (760-1) as Packet (20-1) containing information that a Resource has been locked.

The Second Processing Stage (760-1) is configured to READ from the locked Resource, through the Plurality of Engines (80), in response to the Packet (20-1). The Second Processing Stage (760-1) is further configured to pass the Packet (20-1) along the Packet Bus (200) to the Third Processing Stage (760-2) as the Packet (20-2), which contains information from the READ operation.

The Third Processing Stage (760-2) is configured to WRITE to a Resource, through the Plurality of Engines (80), in response to the Packet (20-2). The Third Processing Stage (760-2) is further configured to pass the Packet (20-2) along the Packet Bus (200) to the Fourth Processing Stage (760-3) as the Packet (20-3), which contains information from the WRITE operations.

The Fourth Processing Stage (760-3) is configured to generate a Resource Lock Release Request in response to the Packet (20-3). The Central Resource Lock Engine (700-0) is configured to receive the Resource Lock Release Request and subsequently release the Resource Lock from the Central Resource Lock Pool Local to Engine (780). The allocated resource has been modified and is now available to be reallocated. The Fourth Processing Stage (760-3) then passes the Packet (20-3) along the Packet Bus (200) as the Packet (20-4).

In this example embodiment, the Central Resource Lock Engine (700-0) can avoid contention for Remote Resources without employing a Resource Release Bus (300). On the other hand, since the Resource Locks are not local to the Plurality of Processing Stages (60), the Lock & Read Operation (105) cannot be performed within a single Processing Stage. Likewise, the Write & Release Operation (106) also cannot be performed within single Processing Stage.

Figure 8:
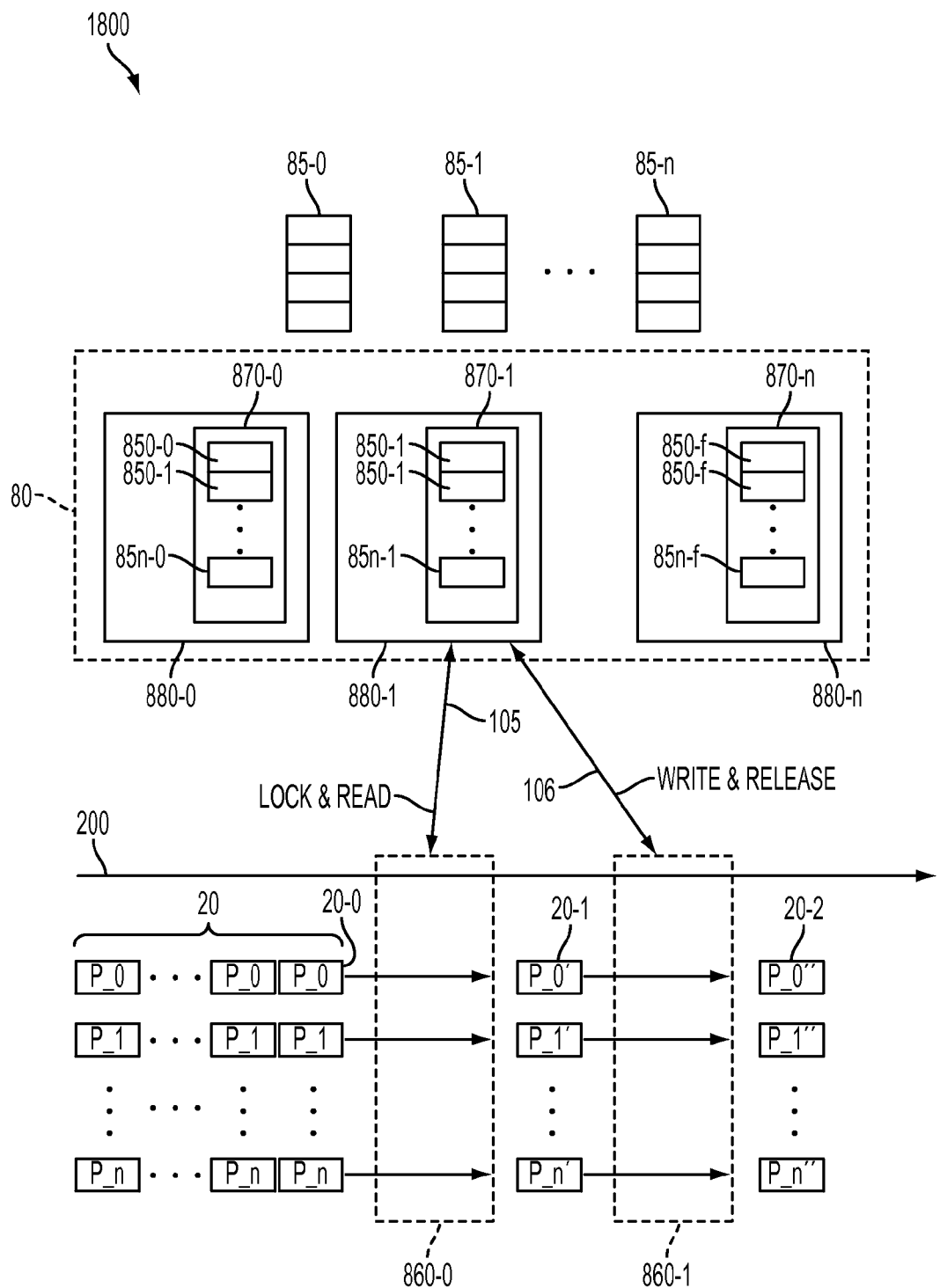
FIG. 8 is a highly simplified schematic diagram of a device according to example embodiments.

FIG. 8 is a highly simplified schematic diagram of a device according to example embodiments. In this example embodiment, the Resource Locks are local to the Engines and not local to the Processing Stages. In FIG. 8, Packet Processing Device (1800) includes a Packet Bus (200), a Packet (20-0, -1, -2) of a Plurality of Parallel Packet Streams (20), a First Processing Stage (860-0), a Second Processing Stage (860-1), Remote Resources (85-0, -1, . . . -n), and a Plurality of Engines (80) containing Resource Lock Engines (880-0, 1, . . . -n).

Each of the Resource Lock Engines (880-0, -1, -n) contains a Respective Resource Lock Pool Local to each Engine (870-0, -1, . . . -n), and each Respective Resource Lock Pool Local to each Engine (870-0, -1, . . . -n) further contains Respective Engine Local Resource Locks (850-0, 851-0, . . . 85n-0; 850-1, 851-a, . . . 85n-1; . . . ; and 850-f, a851-f, 85n-f) according to an example embodiment.

The First Processing Stage (860-0) is configured to perform a Lock & Read Operation (105) in response to a Packet (20-0). The Lock & Read Operation (105) includes accessing a Resource Lock Engine (880-1) to access a Resource Lock Pool Local to Engine (870-1) to request availability of an Engine Local Resource Lock (850-1) corresponding to a Remote Resource (85-1), according to an example embodiment.

The First Processing Stage (860-0) is further configured to LOCK the Remote Resource (85-1) if the Engine Local Resource Locks (850-1) is available. The First Processing Stage (860-0) is further configured to READ a value from the Remote Resource (85-1) and store information of that value into the Execution Context of the Packet (20-0). The First Processing Stage (860-0) then passes the Packet (20-0) along the Packet Bus (200) as a Packet (20-1).

The Second Processing Stage (860-1) is configured to accept the Packet (20-1) and subsequently perform a Write & Release Operation (106) associated with the Remote Resource (85-1) through the Resource Lock Engine (880-1). The Second Processing Stage (860-1) is configured to WRITE to the Remote Resource (85-1) and subsequently send a Resource Lock Release Request to the Resource Lock Engine (880-1). The allocated resource has been modified and is now available to be reallocated.

In the example embodiment of FIG. 8, the Lock & Read Operation (105) can be performed within a single Processing Stage, as can the Write & Release Operation (106). The single Processing Stage, according to an example embodiment, may perform a Lock & Read Operation (105) or a Write & Release Operation (106) within a single stage. The Resource Release Bus (300) is not required. On the other hand, since the Resource Locks are local to each of the Engines, the problem of contention is avoided only for operations seeking the same Remote Resource through the same Engine.

A hybrid architecture implementing a soft path and a hard path will now be discussed in the context of FIGS. 2 and 3, according to example embodiments.

First, the concept of a "path" will be discussed. In FIG. 2, a path is to be understood as the collection of processing stage resources, and the associated packet processing operations, through which a packet passes during its time traversing the pipeline configuration. For example, in FIG. 2, the path through which packets labeled (P_0, P_0', P_0", . . . P_0f) pass includes Respective Processor (30-0) and Buffer (40-0) of Processing Stage (60-0); Respective Processor (30-1) and Buffer (40-1) of Processing Stage (60-1); and so on until the path is concluded with Respective Processor (30-n) and Buffer (40-f) of Processing Stage (60-f).

As shown in FIG. 3, the Respective Processor (30-0, 1, . . . n) is implemented in an example embodiment as a plurality of individual processors, each of which is part of the path through which packets labeled (P_0, P_0', P_0", . . . P_0f) pass. Similarly, another path exists for the packets labeled (P_1, P_1', P_1", . . . P_1f) through Respective Processor (31-0) and Buffer (41-0) of Processing Stage (60-0) and on through Respective Processor (31-n) and Buffer (41-f) of Processing Stage (60-f). Still other paths are apparent in FIG. 2. FIGS. 2 and 3, according to an example embodiment, thus illustrate a packet processing device through which multiple paths exist. Multiple streams of packets are handled at the same time along the multiple paths, i.e., are processed in parallel.

Having explained in more detail the concept of a path, and having explained that an example embodiment provides for multiple paths that process respective packet streams in parallel, some differences between soft and hard paths will now be explained. One difference relates to latency, and the other relates to delivery. Hard paths provide fixed latency, and soft paths do not provide fixed latency. A hard path therefore completes the processing of every hard path packet within a certain, well-defined time period, if at all. A soft path does not achieve the processing of soft path packets in any particular time period, and the soft path packet processing is typically implemented on a best effort basis so as not to impede the processing of hard path packets. On the other hand, soft paths guarantee the processing of soft path packets will complete (i.e., guaranteed delivery), while hard paths sometimes drop hard path packets.

In a hybrid architecture, a packet processing device includes hard paths and one or more soft paths.

In the hybrid architecture, according to an example embodiment, hard path packets under certain circumstances are dropped and not fully processed through the pipeline configuration. That is to say, if the processing for a hard path packet requires a Remote Resource (85-0, -1, -n), but the corresponding Local Resource Lock (50) has a LOCKED state, the hard path packet is dropped. Dropping the hard path packet under such circumstances guarantees that the fixed processing latency is not subverted failure to obtain a resource allocation.

In the hybrid architecture, according to an example embodiment, one or more soft paths are configured to allow for a pause in soft path processing in response to a soft path packet being unable to allocate a Remote Resource. That is to say, if the processing for a soft path packet requires a Remote Resource (85-0, -1, . . . , -n), but the corresponding Local Resource Lock (50) has a LOCKED state, the soft path packet remains in Buffer (40) for that particular Processing Stage until the Local Resource Lock (50) has an UNLOCKED state.

According to an example embodiment, in a packet processing device having the hybrid architecture, the Local Resource Lock (50) acts as a semaphore indicating whether the processing for a soft path packet should be paused. That is to say, when a Local Resource Lock (50) corresponding to a Remote Resource (85-0, -1, . . . , -n) required for the subsequent processing of a soft path packet has a LOCKED state, the processing for the soft path packet is thus paused. A beneficial effect of such a pause is that it mitigates the possibility that the processing for a soft path packet might adversely affect the processing of hard path packets.

To put this another way, in an example embodiment, the use of Local Resource Lock (50) provides a mechanism that permits processing of soft path packets to be interleaved with the processing of hard path packets in such a manner that the soft path packet processing is not carried out when remote resources are already allocated to hard path processing, or to other soft path processing.

According to example embodiments, an Interface Arbiter (120) directs data packets through one of the hard paths, and directs control and management packets along the one or more soft paths.

According to other example embodiments, a packet, for which a Remote Resource must be accessed as part of its processing, is directed along a soft path by Interface Arbiter (120). By directing such packets requiring access to a Remote Resource along the soft path, the interruption of the processing of data packets along the hard path is avoided.

Although the inventive concept has been described above with respect to the various embodiments, it is noted that there can be a variety of permutations and modifications of the described features by those who are familiar with this field, without departing from the technical ideas and scope of the features, which shall be defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, one should not interpret that such specific order and/or arrangements are limited, or that all the operations performed and the components disclosed are needed to obtain a desired result. Accordingly, other implementations are within the scope of the following claims.

What is claimed is:

1. A packet processing device comprising:
   a plurality of processing stages, including a first processing stage and a second processing stage arranged as a packet processing pipeline;
   the first processing stage and the second processing stage each comprising:
   a respective processor configured to process a packet of a packet stream, and
   a respective resource manager having a respective local resource lock corresponding to a remote resource;
   the respective processor being further configured to request the respective resource manager to allocate the remote resource;
   the respective resource manager being further configured to respond to the request to allocate the remote resource by locking the remote resource with the respective local resource lock and allocating the remote resource;
   the respective processor being further configured to implement a packet processing operation associated with the allocated remote resource; and
   the respective resource manager of the second processing stage being further configured to release a remote resource, external to the packet processing pipeline, locked by the first processing stage in the packet processing pipeline.

2. The packet processing device according to claim 1, wherein the first processing stage and the second processing stage are further configured to perform the packet processing operation, in association with the allocated remote resource, before passing the packet to a next one of the plurality of processing stages along the processing pipeline.

3. The packet processing device according to claim 2, wherein the respective resource manager is further configured to:
   send a release request message comprising identifiers for an identified resource manager and for an identified resource lock.

4. The packet processing device according to claim 2, wherein the respective resource manager is further configured to:
   receive a release request message comprising identifiers for an identified resource manager and an identified resource lock.

5. The packet processing device according to claim 1, further comprising:
   a resource release bus connected to the plurality of processing stages; and
   the respective resource manager being further configured to:
   send to upstream ones of the plurality of processing stages a release request message; and
   release the remote resource with the respective local resource lock in response to receiving the release request message.

6. The packet processing device according to claim 1, wherein the respective resource manager is further configured to:
   detect when the remote resource cannot be locked; and
   pause implementation of the packet processing operation until the remote resource is locked.

7. The packet processing device according to claim 1, further comprising the plurality of processing stages being connected in series within a same integrated circuit.

8. A packet processing device, comprising:
   a plurality of processing stages arranged as a packet processing pipeline;
   the processing stages each having processor cores and buffers;
   the processor cores and buffers of the processing stages defining a plurality of paths, for simultaneous packet processing, through the packet processing pipeline;
   an ingress front end configured to direct each packet of an incoming stream of packets into one of the plurality of paths;
   the plurality of paths including a hard path and a soft path, the hard path being configured to process received ones of the incoming stream of packets with fixed latency, the soft path being configured to process received ones of the incoming stream of packets with variable latency; and
   the processing stages each further including a respective resource manager configured to request allocation of a remote resource, for a given packet of the incoming stream of packets in the soft path, in response to an instruction from one of the processor cores, whereby the remote resource is allocated for processing of only the given packet; and
   a respective resource manager of a second processing stage, of the processing stages, being further configured to release a remote resource, external to the packet processing pipeline, locked by a first processing stage, of the processing stages in the packet processing pipeline.

9. The packet processing device as set forth in claim 8, further comprising the respective resource manager requesting allocation of the remote resource by referring to a semaphore locally available in the one of the plurality of processing stages in which the respective resource manager is included.

10. The packet processing device as set forth in claim 8, further comprising:
    a semaphore engine storing a plurality of semaphores, each corresponding to one of a plurality of remote resources; and the respective resource manager requesting allocation of one of the plurality of remote resources by referring to a semaphore controlled by the semaphore engine.

11. The packet processing device as set forth in claim 8, further comprising:
a plurality of engines configured to interface each said respective resource manager with one of a plurality of remote resources; and
the respective resource manager requesting allocation of one of the plurality of remote resources by referring to a semaphore controlled by one of the plurality of engines.

12. A packet processing method, for a plurality of processing stages of a pipeline packet processing device, comprising:
receiving, at a processor of a first processing stage, a first packet and a request for allocation of a remote resource;
responding, by the processor, to the allocation request, by controlling a respective resource manager of the first processing stage to set a semaphore locking the remote resource and allocating the remote resource;
implementing, by the processor, a first packet processing operation, in association with the allocated remote resource, and in association with the first packet, to obtain a processed first packet; and
outputting the processed first packet to a next processing stage of the pipeline packet processing device; and
releasing, by a respective resource manager of the next processing stage, the remote resource, external to the pipeline, locked by an upstream processing stage in the pipeline.

13. The method of claim 12, further comprising:
receiving a second packet and an indication of allocation of the remote resource;
implementing a second packet processing operation, associated with the allocated remote resource, on the second packet, to obtain a second processed packet;
requesting the release of the remote resource; and
outputting the second processed packet to a next processing stage of the pipeline packet processing device.

14. The method of claim 12, further comprising outputting a remote resource release indication to the upstream processing stage of the pipeline packet processing device in response to a completion of a second packet processing operation associated with the allocated remote resource.

15. The method of claim 12, further comprising obtaining the indication of the allocation of the remote resource from an execution context received together with the processed first packet.

16. A packet processing device comprising:
a plurality of processing stages, arranged as a packet processing pipeline, configured to process packets in a first direction along the packet processing pipeline;
a lock release message path connecting the plurality of processing stages, configured to communicate along a second direction opposite to said first direction;
each of the plurality of processing stages including:
a respective local resource manager having a respective local resource lock corresponding to a remote resource, and
a respective processor core; and
a respective local resource manager, of a first of the plurality of processing stages, being configured to respond to a request to allocate the remote resource by locking the remote resource with the respective local resource lock;
a respective processor core of the first of the plurality of processing stages being configured to implement a packet processing operation associated with the allocated remote resource;
a respective processor core of a second of the plurality of processing stages being configured to send, along the lock release message path, a resource lock release request message identifying one of the plurality of processing stages and identifying a resource to be released; and
the respective resource manager of a second processing stage, of the processing stages, being further configured to release the remote resource, external to the packet processing pipeline, locked by the first of the processing stages in the packet processing pipeline.

17. The packet processing device as set forth in claim 16, further comprising a local lock buffer configured to buffer a packet when the respective local resource lock indicates that a corresponding resource is not unlocked.

18. The packet processing device as set forth in claim 16, wherein each of the plurality of processing stages further comprises a plurality of processor cores, the processor cores and buffers of the plurality of processing stages defining a plurality of paths, for simultaneous packet processing, through the packet processing pipeline.

19. The packet processing device as set forth in claim 18, further comprising an ingress front end configured to direct each of the packets into one of the plurality of paths.

20. The packet processing device as set forth in claim 19, further comprising the plurality of paths being configured as a hard path and a soft path, the hard path being configured to process received ones of the packets with fixed latency, and the soft path being configured to process received ones of the packets with variable latency, the ingress front end directing a packet requiring a remote resource to only the soft path.

* * * * *